(12) United States Patent
Lin et al.

(10) Patent No.: US 9,698,671 B2
(45) Date of Patent: Jul. 4, 2017

(54) SINGLE-STAGE AC-TO-DC CONVERTER WITH VARIABLE DUTY CYCLE

(71) Applicant: LITE-ON TECHNOLOGY CORP., Taipei (TW)

(72) Inventors: Jing-Yuan Lin, Taipei (TW); Kuan-Fu Chou, Hsinchu County (TW); Yao-Ching Hsieh, Kaohsiung (TW); Huang-Jen Chiu, Taipei (TW); Yu-Kang Lo, Taipei (TW); Po-Jung Tseng, Taipei (TW)

(73) Assignee: Lite-On Technology Corp., Taipei (TW)

( * ) Notice: Subject to any disclaimer, the term of this patent is extended or adjusted under 35 U.S.C. 154(b) by 0 days.

(21) Appl. No.: 15/003,923

(22) Filed: Jan. 22, 2016

(65) Prior Publication Data
US 2017/0133926 A1 May 11, 2017

(30) Foreign Application Priority Data
Nov. 9, 2015 (CN) .......................... 2015 1 0754895

(51) Int. Cl.
*H02M 1/42* (2007.01)
*H02M 3/335* (2006.01)

(52) U.S. Cl.
CPC ..... *H02M 1/4241* (2013.01); *H02M 3/33507* (2013.01)

(58) Field of Classification Search
CPC ........................ H02M 1/4241; H02M 3/33507
See application file for complete search history.

(56) References Cited

U.S. PATENT DOCUMENTS

| 2013/0301307 A1* | 11/2013 | Kardolus | .......... | H02M 3/33569 363/21.02 |
| 2013/0336017 A1* | 12/2013 | Uno | .................. | H02M 3/33507 363/21.02 |
| 2014/0117878 A1* | 5/2014 | Prodic | ................. | H05B 33/0815 315/307 |
| 2015/0060426 A1* | 3/2015 | Schartner | ............... | B23K 9/173 219/130.21 |
| 2015/0198634 A1* | 7/2015 | Brinlee | .................. | G01R 31/28 324/72.5 |

* cited by examiner

*Primary Examiner* — Emily P Pham
*Assistant Examiner* — Lakaisha Jackson
(74) *Attorney, Agent, or Firm* — Rosenberg, Klein & Lee (57) ABSTRACT

A single-stage AC-to-DC converter includes a bus capacitor, a power factor correcting module, a resonant converting module and a control module. The power factor correcting module generates, based on an AC (alternating current) input voltage, a first control signal and a second control signal, a DC (direct current) bus voltage across the bus capacitor and an intermediate voltage switching between the bus voltage and zero. The resonant converting module generates a DC output voltage based on the intermediate voltage. The control module generates, based on the bus voltage, the first and second control signals, each of which switches between an active state and an inactive state and has a duty cycle associated with the bus voltage.

14 Claims, 10 Drawing Sheets

SINGLE-STAGE AC-TO-DC CONVERTER WITH VARIABLE DUTY CYCLE

CROSS-REFERENCE TO RELATED APPLICATION

This application claims priority of Chinese Application No. 201510754895.2, filed on Nov. 9, 2015.

FIELD

This disclosure relates to power conversion, and more particularly to a single-stage AC-to-DC converter.

BACKGROUND

AC-to-DC converters may convert an AC (alternating current) input voltage into a DC (direct current) output voltage using a single-stage scheme or a multi-stage scheme. A single-stage AC-to-DC converter has relatively high conversion efficiency, relatively simple control logic, a relatively small number of elements and a relatively low cost as compared to a multi-stage AC-to-DC converter. How the single-stage AC-to-DC converter can be undamaged over a relatively wide range of input voltages and can simultaneously provide the output voltage with a relatively small ripple component is important.

SUMMARY

Therefore, an object of this disclosure is to provide a single-stage AC-to-DC converter that can be undamaged over a relatively wide range of input voltages and can simultaneously provide an output voltage with a relatively small ripple component.

According to this disclosure, a single-stage AC-to-DC converter includes a bus capacitor, a power factor correcting module, a resonant converting module and a control module. The power factor correcting module is coupled to the bus capacitor, is used to receive an AC (alternating current) input voltage, further receives a first control signal and a second control signal, and generates, based on the input voltage and the first and second control signals, a DC (direct current) bus voltage across the bus capacitor and an intermediate voltage switching between the bus voltage and zero. The resonant converting module is coupled to the power factor correcting module for receiving the intermediate voltage therefrom, and generates a DC output voltage based on the intermediate voltage. The control module is coupled to the bus capacitor for receiving the bus voltage therefrom, is coupled further to the power factor correcting module, and generates, based on the bus voltage, the first and second control signals for the power factor correcting module. Each of the first and second control signals switches between an active state and an inactive state, and has a duty cycle associated with the bus voltage.

BRIEF DESCRIPTION OF THE DRAWINGS

Other features and advantages of this disclosure will become apparent in the following detailed description of the embodiment(s) with reference to the accompanying drawings, of which.

DETAILED DESCRIPTION

Figure 1:
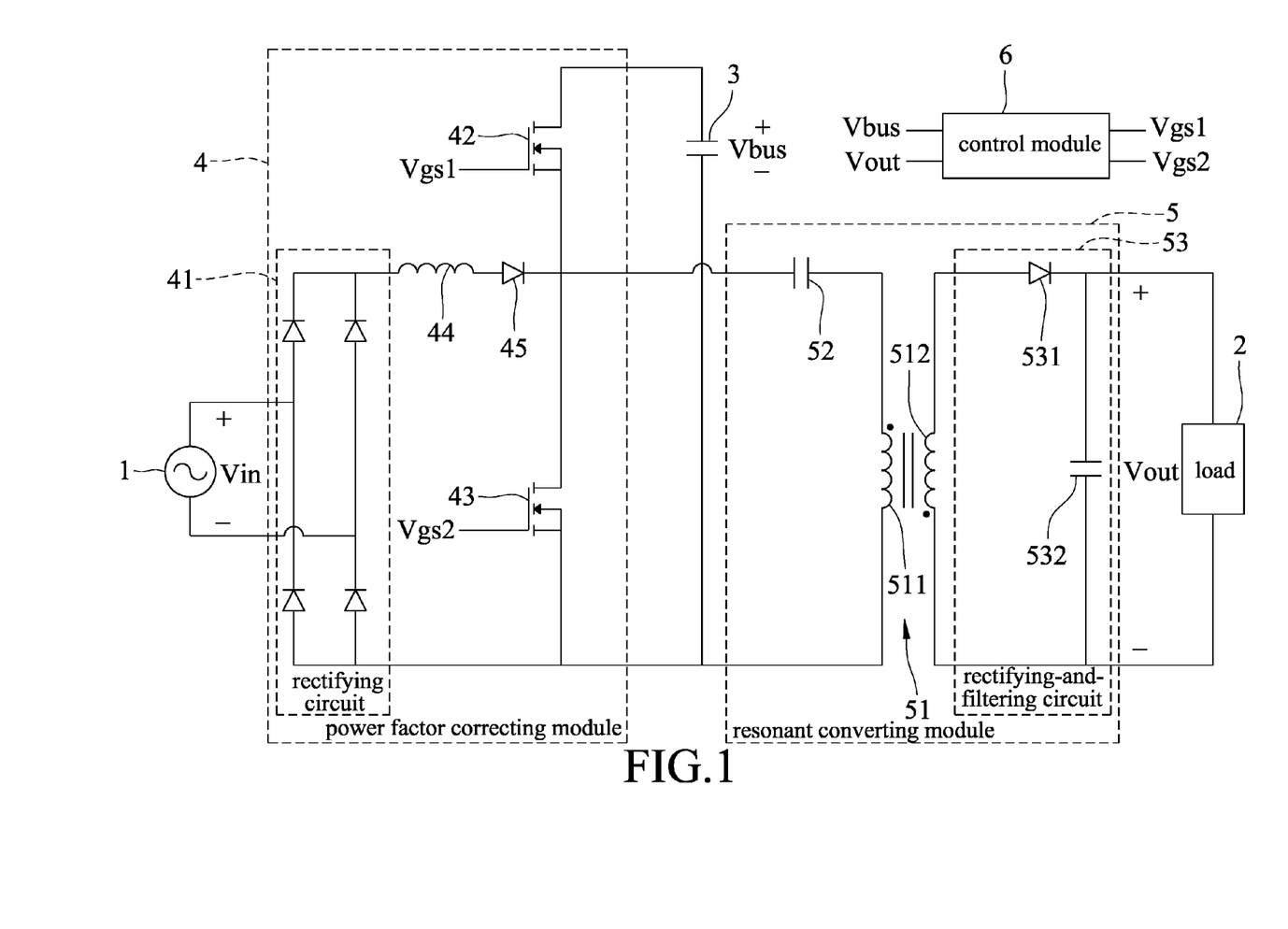
FIG. 1 is a circuit block diagram illustrating an embodiment of a single-stage AC-to-DC converter according to this disclosure.

Referring to FIG. 1, an embodiment of a single-stage AC-to-DC converter according to this disclosure is used to receive an AC (alternating current) input voltage (Vin) from a power source 1, converts the input voltage (Vin) into a DC (direct current) output voltage (Vout), and is used to output the output voltage (Vout) to a load 2. The single-stage AC-to-DC converter of this embodiment includes a bus capacitor 3, a power factor correcting module 4, a resonant converting module 5 and a control module 6.

The bus capacitor 3 has a first terminal and a second terminal.

The power factor correcting module 4 is coupled to the bus capacitor 3, is used to be coupled further to the power source 1 for receiving the input voltage (Vin) therefrom, and further receives a first control signal (Vgs1) and a second control signal (Vgs2), and generates, based on the input voltage (Vin) and the first and second control signals (Vgs1, Vgs2), a DC bus voltage (Vbus) across the bus capacitor 3 and an intermediate voltage switching between the bus voltage (Vbus) and zero.

In this embodiment, the bus voltage (Vbus) is greater than an amplitude of the input voltage (Vin), and the power factor correcting module 4 includes a rectifying circuit 41, a first switch 42, a second switch 43, a boost inductor 44 and a third switch 45. The rectifying circuit 41 has a first input terminal and a second input terminal that are used to be coupled to the power source 1 for receiving the input voltage (Vin) therefrom. The rectifying circuit 41 further has a first output terminal, and a second output terminal that is coupled to the second terminal of the bus capacitor 3. The first switch 42 has a first terminal that is coupled to the first terminal of the bus capacitor 3, a second terminal, and a control terminal that receives the first control signal (Vgs1). The second switch 43 has a first terminal that is coupled to the second terminal of the first switch 42, a second terminal that is coupled to the second output terminal of the rectifying circuit 41, and a control terminal that receives the second control signal (Vgs2). A voltage across the second switch 43 serves as the intermediate voltage. The boost inductor 44 and the third switch 45 are coupled in series between the first output terminal of the rectifying circuit 41 and the second terminal of the first switch 42.

In this embodiment, the rectifying circuit 41 is a full bridge rectifying circuit including four switches (e.g., four diodes). The first switch 42 is an N-type metal oxide semiconductor field effect transistor (nMOSFET) having a drain terminal, a source terminal and a gate terminal that serve respectively as the first, second and control terminals of the first switch 42. The second switch 43 is an nMOSFET having a drain terminal, a source terminal and a gate terminal that serve respectively as the first, second and control terminals of the second switch 43. The boost inductor 44 has a first terminal that is coupled to the first output terminal of the rectifying circuit 41, and a second terminal. The third switch 45 is a diode having an anode that is coupled to the second terminal of the boost inductor 44, and a cathode that is coupled to the second terminal of the first switch 42.

The resonant converting module 5 is coupled to the power factor correcting module 4 for receiving the intermediate voltage therefrom, is used to be coupled further to the load 2, and generates the output voltage (Vout) for the load 2 based on the intermediate voltage.

In this embodiment, the output voltage (Vout) is lower than the bus voltage (Vbus), and the resonant converting module 5 includes a transformer 51, a resonant capacitor 52 and a rectifying-and-filtering circuit 53. The transformer 51 includes a primary winding 511 and a secondary winding 512. The primary winding 511 has a number of turns greater than that of the secondary winding 512. The resonant capacitor 52 and the primary winding 511 are coupled in series across the second switch 43 for receiving the intermediate voltage therefrom. The rectifying-and-filtering circuit 53 is coupled to the secondary winding 512, and is used to be coupled further to the load 2 for providing the output voltage (Vout) thereto.

In this embodiment, each of the primary and secondary windings 511, 512 has a first terminal and a second terminal. The first terminals of the primary and secondary windings 511, 512 have the same voltage polarity. The secondary terminal of the primary winding 511 is coupled to the second terminal of the second switch 43. The resonant capacitor 52 is coupled between the first terminal of the second switch 43 and the first terminal of the primary winding 511. The rectifying-and-filtering circuit 53 includes a fourth switch 531 that is used for rectification, and an output capacitor 532 that is used for filtering. The output capacitor 532 is used to be coupled to the load 2 in parallel. The fourth switch 531 and the parallel connection of the output capacitor 532 and the load 2 are coupled in series across the secondary winding 512. The output capacitor 532 has a first terminal, and a second terminal that is coupled to the first terminal of the secondary winding 512, and a voltage thereacross serves as the output voltage (Vout). The fourth switch 531 is a diode having an anode that is coupled to the second terminal of the secondary winding 512, and a cathode that is coupled to the first terminal of the output capacitor 532.

Each of the first, second, third and fourth switches 42, 43, 45, 531 is operable between an ON state and an OFF state.

Figure 2:
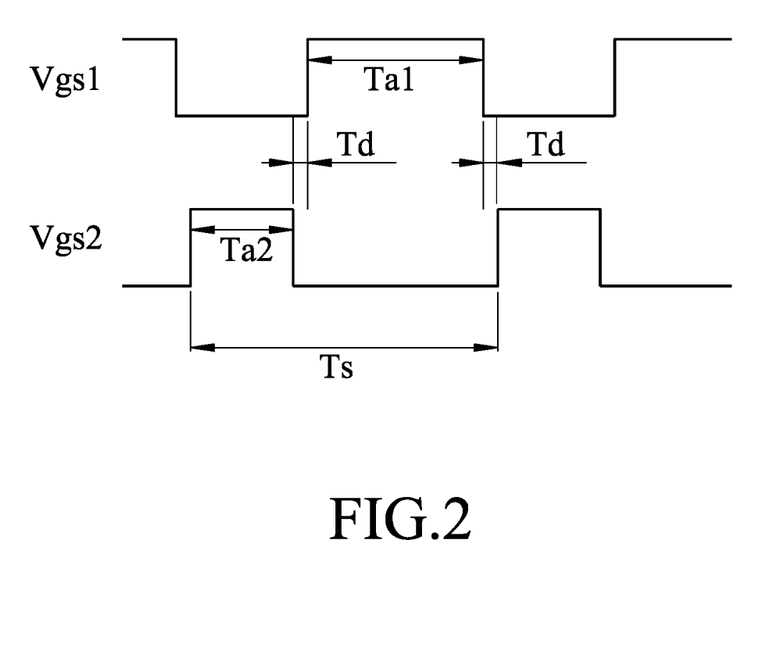
FIG. 2 is a timing diagram illustrating a first control signal and a second control signal of the embodiment.

Referring to FIGS. 1 and 2, the control module 6 is coupled to the bus capacitor 3 and the output capacitor 532 for receiving the bus voltage (Vbus) and the output voltage (Vout) respectively therefrom, is coupled further to the control terminals of the first and second switches 42, 43, and generates, based on the bus voltage (Vbus) and the output voltage (Vout), the first and second control signals (Vgs1, Vgs2) respectively for the first and second switches 42, 43. Each of the first and second control signals (Vgs1, Vgs2) switches between an active state (e.g., being a logic high level, and corresponding to the ON state of the respective one of the first and second switches 42, 43) and an inactive state (e.g., being a logic low level, and corresponding to the OFF state of the respective one of the first and second switches 42, 43), and has a duty cycle and a switching period that are associated respectively with the bus voltage (Vbus) and the output voltage (Vout).

In this embodiment, the first and second control signals (Vgs1, Vgs2) have the same switching period of Ts, and are alternately in the active state. When one of the first and second control signals (Vgs1, Vgs2) is in the active state, the other one of the first and second control signals (Vgs1, Vgs2) is in the inactive state. One of the first and second control signals (Vgs1, Vgs2) switches to the active state at an end of a predetermined dead time interval of Td counting from each instance of the other one of the first and second control signals (Vgs1, Vgs2) switching to the inactive state.

In this embodiment, the control module 6 increases the duty cycle of the first control signal (Vgs1) and decreases the duty cycle of the second control signal (Vgs2) when the bus voltage (Vbus) is higher than a predetermined first target voltage, and decreases the duty cycle of the first control signal (Vgs1) and increases the duty cycle of the second control signal (Vgs2) when the bus voltage (Vbus) is lower than the first target voltage, so as to stabilize the bus voltage (Vbus) at the first target voltage. The control module 6 further decreases the switching period of each of the first and second control signals (Vgs1, Vgs2) when the output voltage (Vout) is higher than a predetermined second target voltage, and increases the switching period of each of the first and second control signals (Vgs1, Vgs2) when the output voltage (Vout) is lower than the second target voltage, so as to stabilize the output voltage (Vout) at the second target voltage. As a result, the first control signal (Vgs1) has an active time interval of Ta1 that is determined by the switching period thereof and the duty cycle thereof, and the second control signal (Vgs2) has an active time interval of Ta2 that is determined by the switching period thereof and the duty cycle thereof.

In this embodiment, under the control of the control module 6, the power factor correcting module 4 operates in a discontinuous conduction mode, so as to allow a current provided by the power source 1 to have a phase that follows a phase of the input voltage (Vin) provided by the same, thereby attaining a high power factor.

Figure 3:
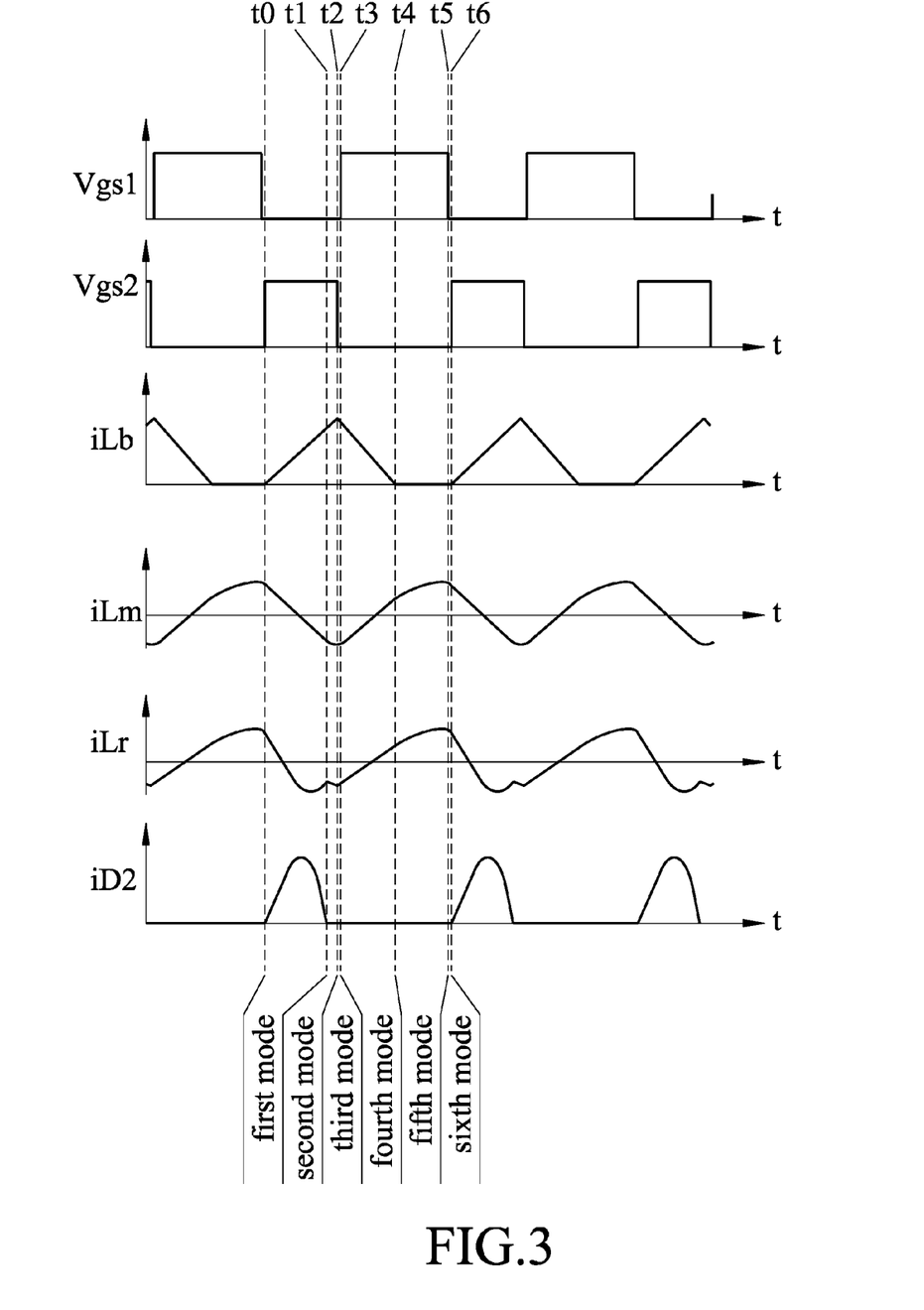
FIG. 3 is a timing diagram illustrating operation of the embodiment.

Referring to FIGS. 3 to 9, the single-stage AC-to-DC converter of this embodiment operates cyclically in first to sixth modes. In FIGS. 4 to 9, an intrinsic diode 421, 431 and a parasitic capacitor 422, 432 of each of the first and second switches 42, 43 are depicted, an imaginary magnetizing inductor 513 and an imaginary leakage inductor 514 that are used for modeling non-ideal characteristics of the transformer 51 are depicted, the control module 6 (see FIG. 1) is not depicted, conducting elements are depicted by solid lines, and non-conducting elements are depicted by doted lines. FIG. 3 depicts the first control signal (Vgs1), the second control signal (Vgs2), a current (iLb) flowing through the boost inductor 44, a current (iLm) flowing through the magnetizing inductor 513, a current (iLr) flowing through the leakage inductor 514, and a current (iD2) flowing through the fourth switch 531. It is noted that, in FIG. 3, a waveform of each current (iLb, iLm, iLr, iD2) conveys information regarding both a magnitude and a direction of the current (i.e., positive and negative values of the current indicate opposite directions of the current), and in FIGS. 4 to 9, the direction of each current (iLb, iLm, iLr, iD2) is shown by a corresponding arrow. In addition, the resonant capacitor 52 may resonate with the leakage inductor 514 at a resonant frequency determined by a capacitance of the resonant capacitor 52 and an inductance of the leakage inductor 514.

Figure 4:
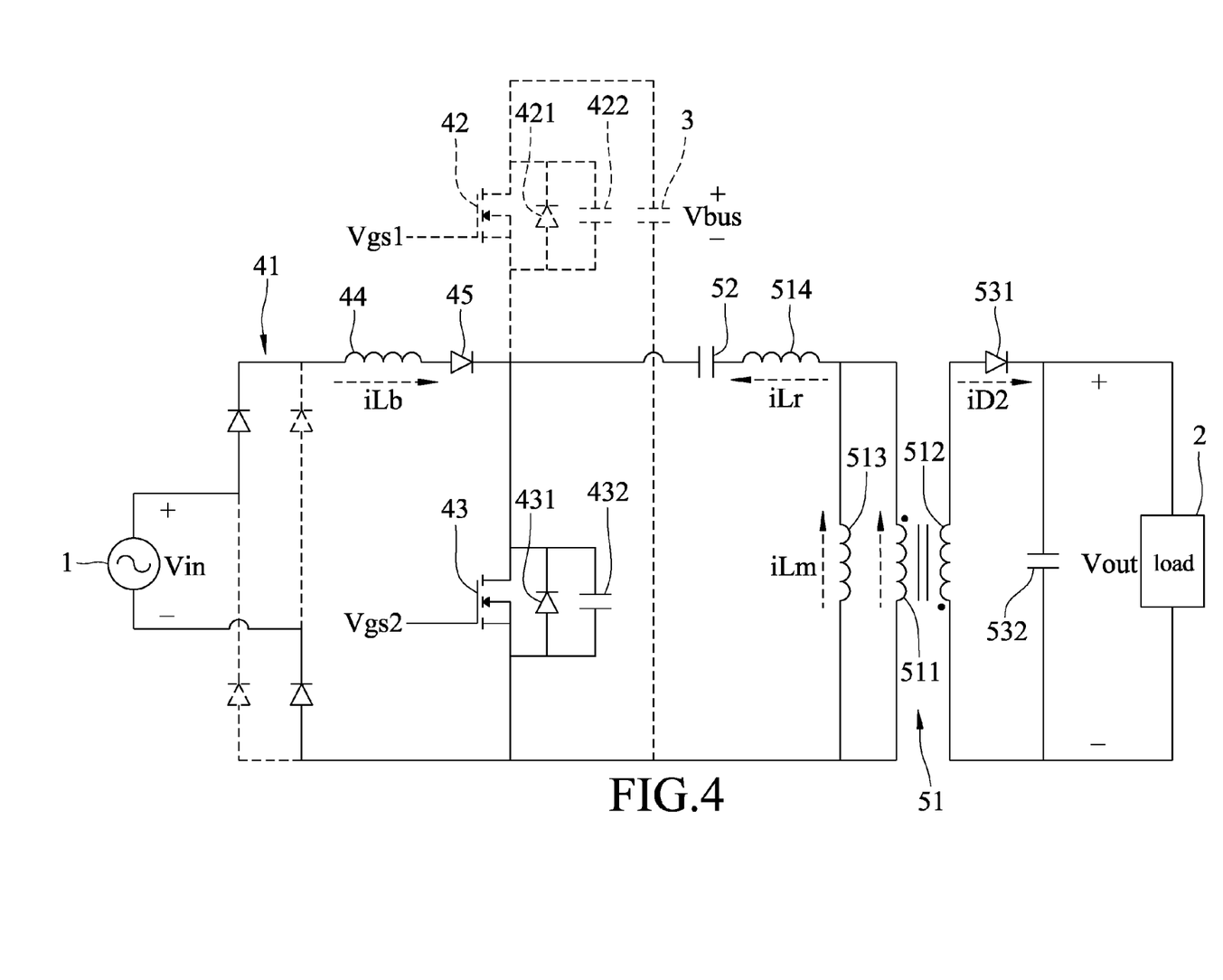
FIGS. 4 to 9 are equivalent circuit diagrams illustrating the embodiment operating in first to sixth modes, respectively.

Referring to FIGS. 3 and 4, the single-stage AC-to-DC converter of this embodiment operates in the first mode during an interval from time t0 to time t1. In the first mode, the first switch 42 is in the OFF state, and the second switch 43 enters the ON state with ZVS (zero voltage switching). The third switch 45 enters the ON state, the boost inductor 44 is charged, and the current (iLb) flowing through the boost inductor 44 linearly increases from zero. The magnitude of the current (iLm) flowing through the magnetizing inductor 513 gradually decreases to zero, and then the direction of the same reverses and the magnitude of the same gradually increases from zero. The magnitude of the current (iLr) flowing through the leakage inductor 514 gradually decreases to zero, and then the direction of the same reverses and the magnitude of the same gradually increases from zero to its maximum value and then gradually decreases. The magnitude of the current (iLm) flowing through the magnetizing inductor 513 dose not equal the magnitude of the current (iLr) flowing through the leakage inductor 514. The fourth switch 531 enters the ON state, and energy goes to the output capacitor 532 and the load 2 through the transformer 51 and the fourth switch 531. A voltage across the first switch 42 equals the bus voltage (Vbus). A voltage across the second switch 43 is zero. FIG. 4 only depicts the direction of each of the currents (iLm, iLr) flowing respectively through the magnetizing inductor 513 and the leakage inductor 514 after the reversal of the same.

Figure 5:
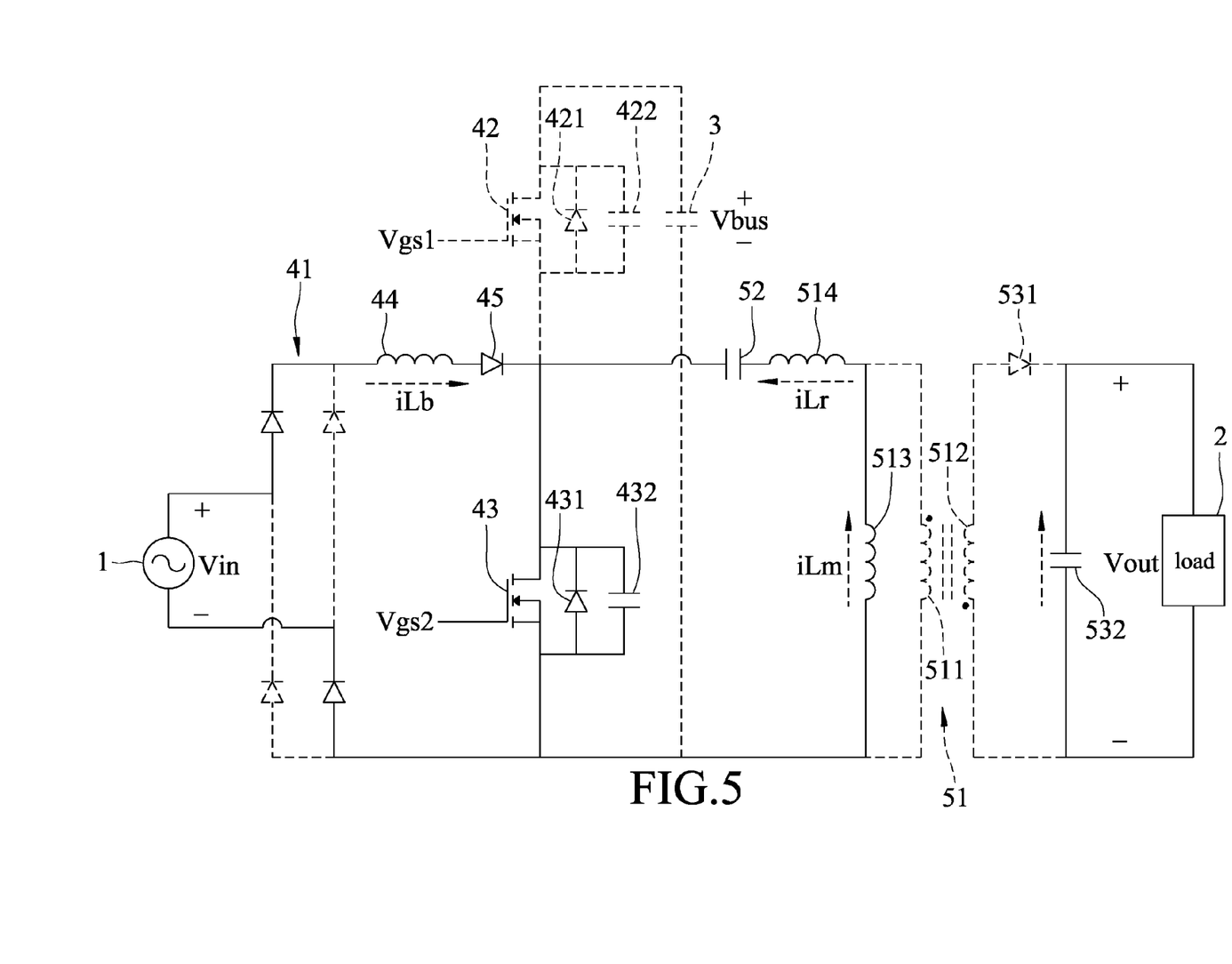

Referring to FIGS. 3 and 5, the single-stage AC-to-DC converter of this embodiment operates in the second mode during an interval from time t1 to time t2. In the second mode, the first switch 42 remains in the OFF state, and the second switch 43 remains in the ON state. The third switch 45 remains in the ON state, the boost inductor 44 is charged, and the current (iLb) flowing through the boost inductor 44 linearly increases. The magnitude of each of the currents (iLm, iLr) flowing respectively through the magnetizing inductor 513 and the leakage inductor 514 gradually increases. The magnitude of the current (iLm) flowing through the magnetizing inductor 513 equals the magnitude of the current (iLr) flowing through the leakage inductor 514. The fourth switch 531 enters the OFF state with ZCS (zero current switching), and energy stored in the output capacitor 532 is released to the load 2. The voltage across the first switch 42 equals the bus voltage (Vbus). The voltage across the second switch 43 is zero.

Figure 6:
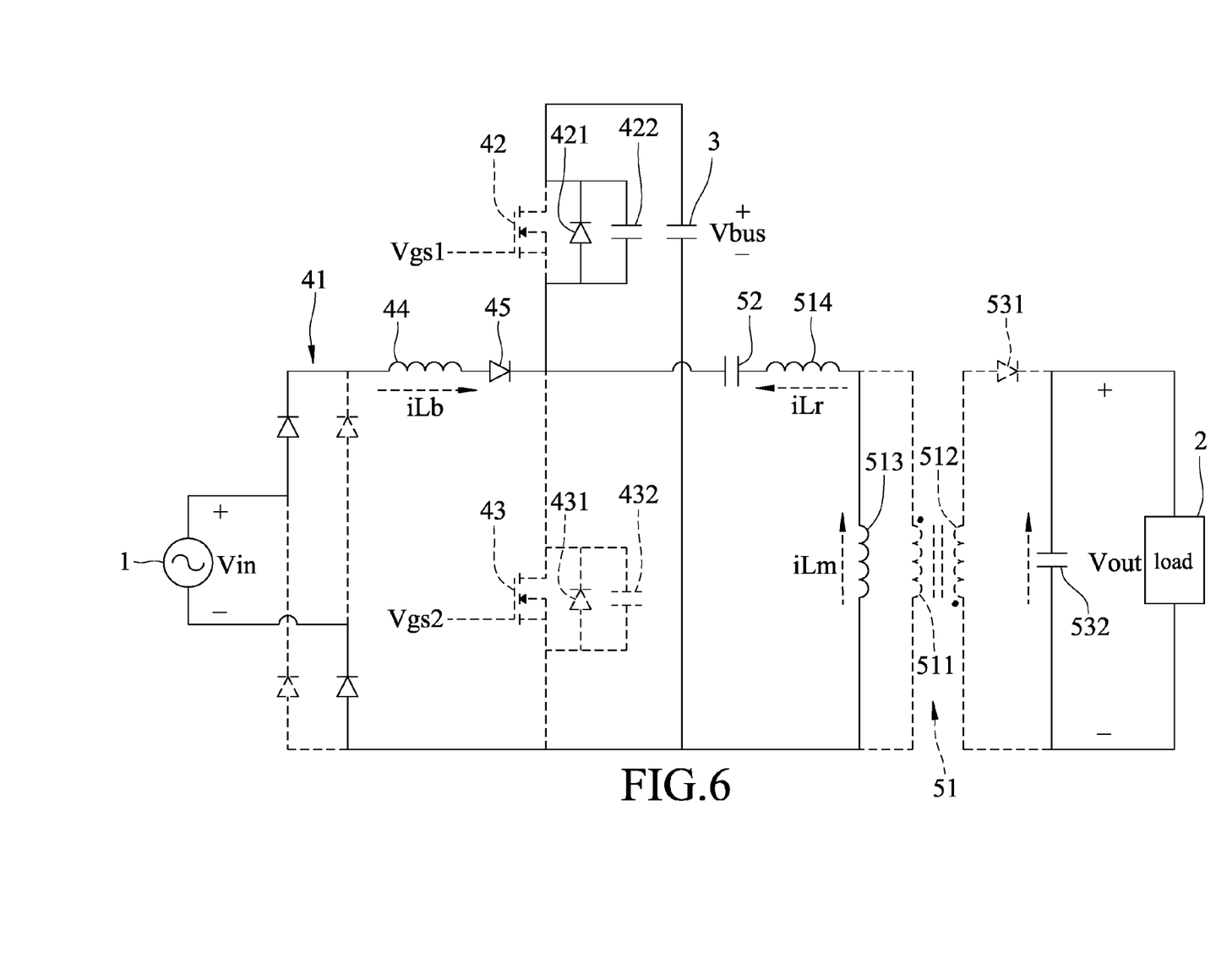

Referring to FIGS. 3 and 6, the single-stage AC-to-DC converter of this embodiment operates in the third mode during an interval from time t2 to time t3. In the third mode, the first switch 42 remains in the OFF state, and the second switch 43 enters the OFF state. The third switch 45 remains in the ON state, energy stored in the boost inductor 44 is released, and the current (iLb) flowing through the boost inductor 44 linearly decreases. The magnitude of each of the currents (iLm, iLr) flowing respectively through the magnetizing inductor 513 and the leakage inductor 514 gradually decreases. The magnitude of the current (iLm) flowing through the magnetizing inductor 513 equals the magnitude of the current (iLr) flowing through the leakage inductor 514. The fourth switch 531 remains in the OFF state, and energy stored in the output capacitor 532 is released to the load 2. Energy stored in the parasitic capacitor 422 of the first switch 42 is released, such that the voltage across the first switch 42 decreases from the bus voltage (Vbus) to zero, and then the intrinsic diode 421 of the first switch 42 conducts, such that the voltage across the first switch 42 remains at zero. The parasitic capacitor 432 of the second switch 43 is charged, such that the voltage across the second switch 43 increases from zero to the bus voltage (Vbus). The bus capacitor 3 is charged. FIG. 6 only depicts the parasitic capacitor 432 of the second switch 43 after the charging of the same finishes.

Figure 7:
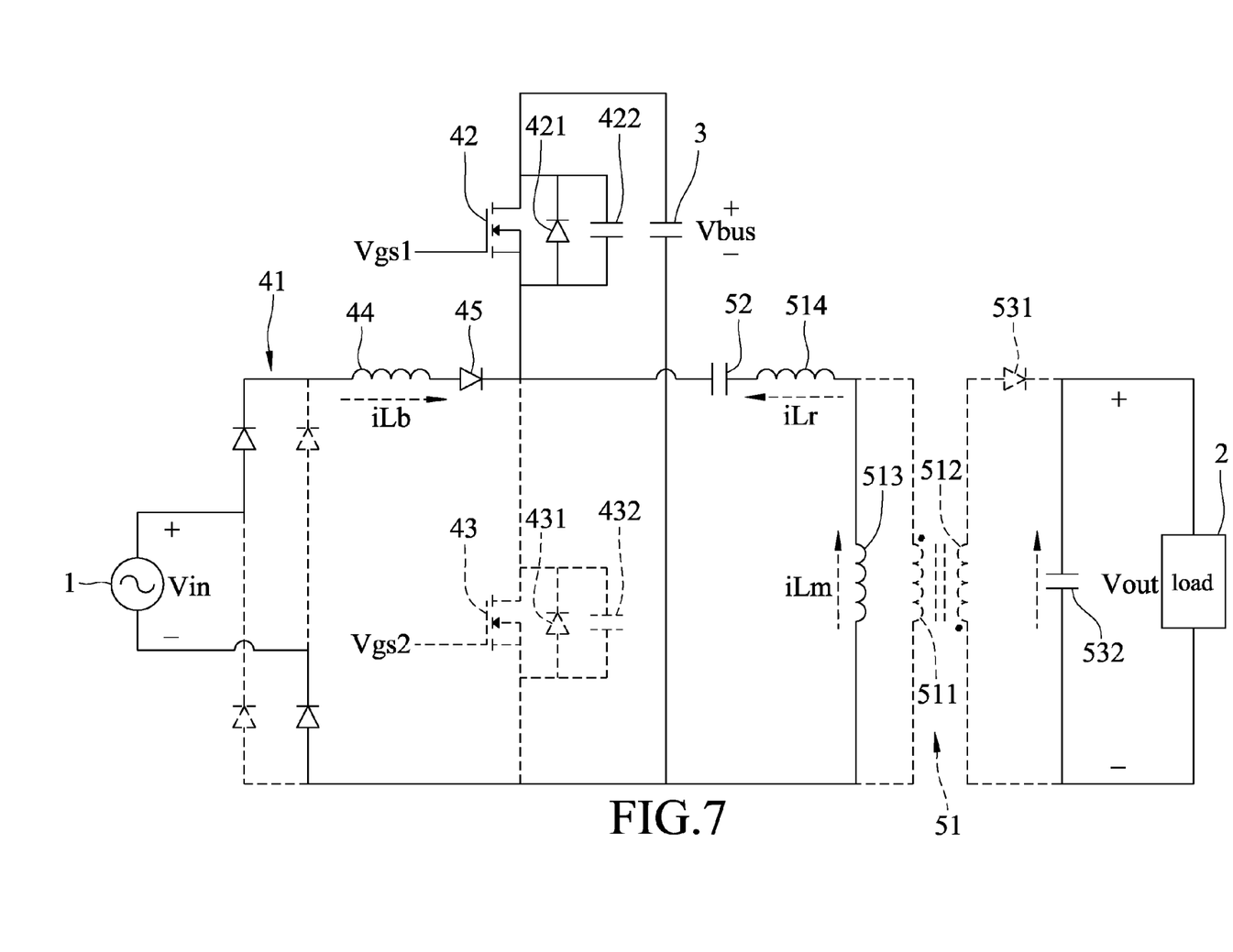

Referring to FIGS. 3 and 7, the single-stage AC-to-DC converter of this embodiment operates in the fourth mode during an interval from time t3 to time t4. In the fourth mode, the first switch 42 enters the ON state with ZVS, and the second switch 43 remains in the OFF state. The third switch 45 remains in the ON state, energy stored in the boost inductor 44 is released, and the current (iLb) flowing through the boost inductor 44 linearly decreases to zero. The magnitude of each of the currents (iLm, iLr) flowing respectively through the magnetizing inductor 513 and the leakage inductor 514 gradually decreases to zero, and then the direction of the same reverses and the magnitude of the same gradually increases. The magnitude of the current (iLm) flowing through the magnetizing inductor 513 equals the magnitude of the current (iLr) flowing through the leakage inductor 514. The fourth switch 531 remains in the OFF state, and energy stored in the output capacitor 532 is released to the load 2. The voltage across the first switch 42 is zero. The voltage across the second switch 43 equals the bus voltage (Vbus). The bus capacitor 3 is charged, and then energy stored therein is released. FIG. 7 only depicts the direction of each of the currents (iLm, iLr) flowing respectively through the magnetizing inductor 513 and the leakage inductor 514 before the reversal of the same.

Figure 8:
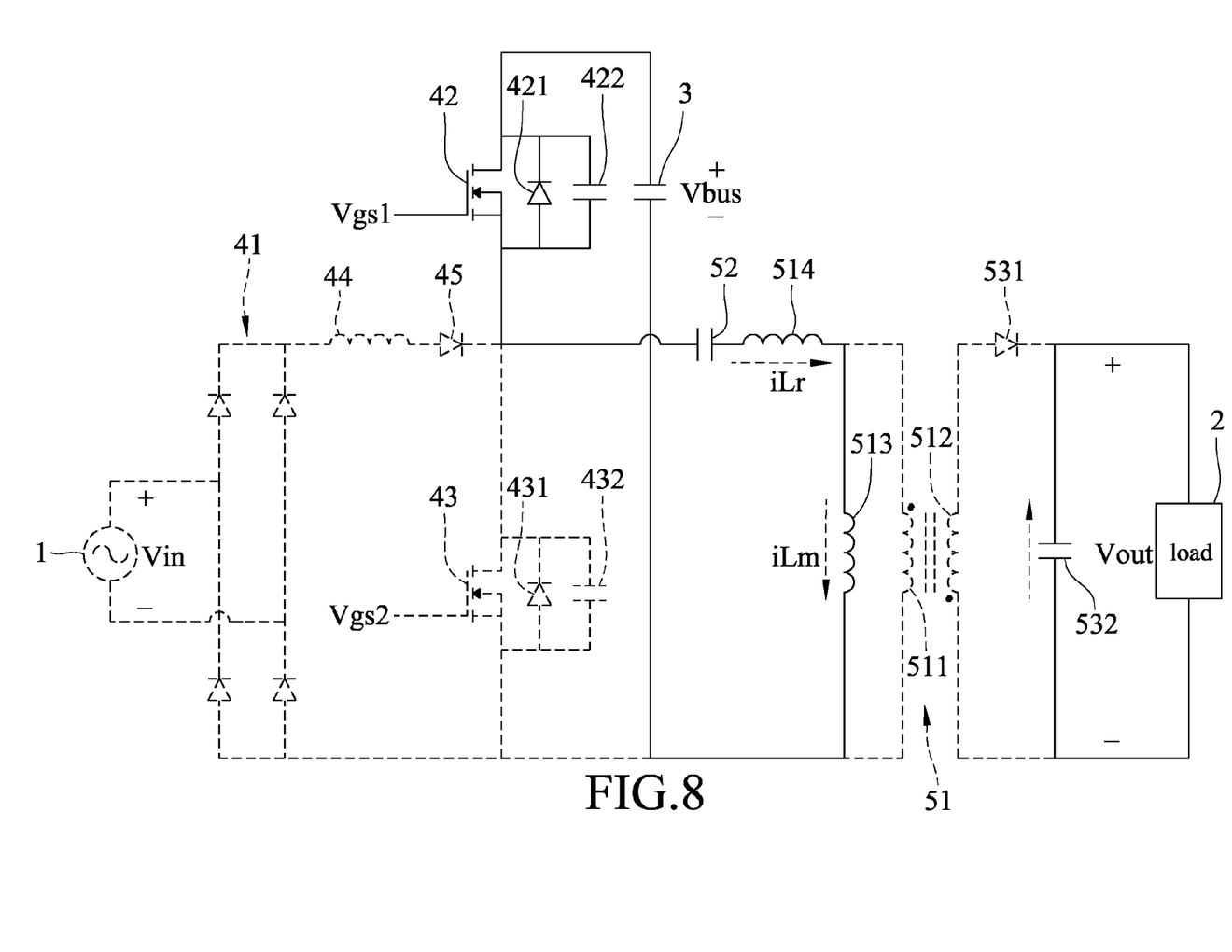

Referring to FIGS. 3 and 8, the single-stage AC-to-DC converter of this embodiment operates in the fifth mode during an interval from time t4 to time t5. In the fifth mode, the first switch 42 remains in the ON state, and the second switch 43 remains in the OFF state. The third switch 45 enters the OFF state with ZCS, and the current (iLb) flowing through the boost inductor 44 is zero. The magnitude of each of the currents (iLm, iLr) flowing respectively through the magnetizing inductor 513 and the leakage inductor 514 gradually increases. The magnitude of the current (iLm) flowing through the magnetizing inductor 513 equals the magnitude of the current (iLr) flowing through the leakage inductor 514. The fourth switch 531 remains in the OFF state, and energy stored in the output capacitor 532 is released to the load 2. The voltage across the first switch 42 is zero. The voltage across the second switch 43 equals the bus voltage (Vbus). Energy stored in the bus capacitor 3 is released.

Figure 9:
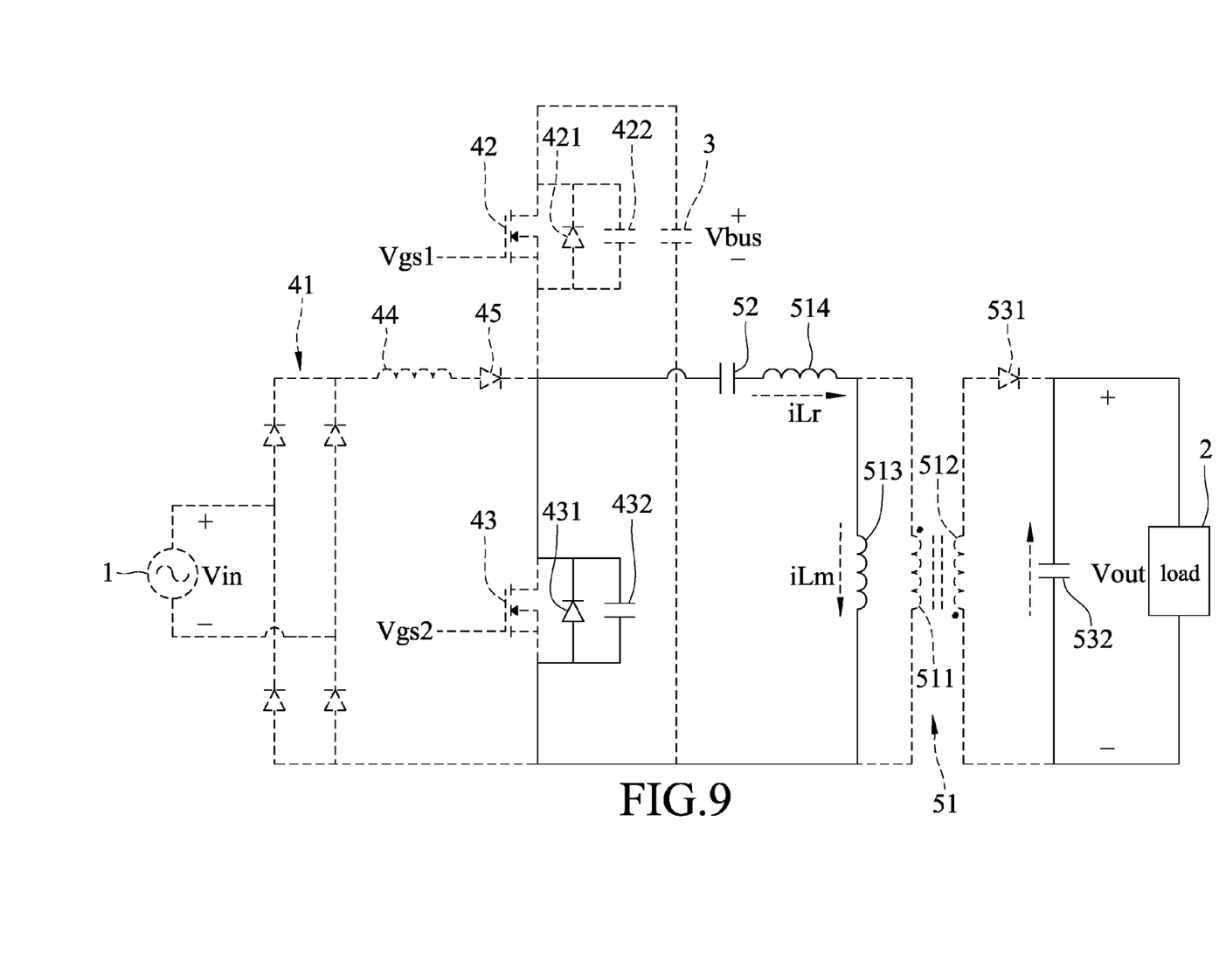

Referring to FIGS. 3 and 9, the single-stage AC-to-DC converter of this embodiment operates in the sixth mode during an interval from time t5 to time t6. In the sixth mode, the first switch 42 enters the OFF state, and the second switch 43 remains in the OFF state. The third switch 45 remains in the OFF state, and the current (iLb) flowing through the boost inductor 44 is zero. The magnitude of each of the currents (iLm, iLr) flowing respectively through the magnetizing inductor 513 and the leakage inductor 514 gradually decreases. The magnitude of the current (iLm) flowing through the magnetizing inductor 513 equals the magnitude of the current (iLr) flowing through the leakage inductor 514. The fourth switch 531 remains in the OFF state, and energy stored in the output capacitor 532 is released to the load 2. The parasitic capacitor 422 of the first switch 42 is charged, such that the voltage across the first switch 42 increases from zero to the bus voltage (Vbus). Energy stored in the parasitic capacitor 432 of the second switch 43 is released, such that the voltage across the second switch 43 decreases from the bus voltage (Vbus) to zero, and then the intrinsic diode 431 of the second switch 43 conducts, such that the voltage across the second switch 43 remains at zero. FIG. 9 only depicts the parasitic capacitor 422 of the first switch 42 after the charging of the same finishes.

Referring to FIG. 1, in view of the above, the single-stage AC-to-DC converter of this embodiment has the following advantages:

1. Since the control module 6 adjusts the duty cycle of each of the first and second control signals (Vgs1, Vgs2)

based on the bus voltage (Vbus), variation of the bus voltage (Vbus) according to an impedance of the load 2 can be prevented, and the single-stage AC-to-DC converter of this embodiment can be undamaged over a relatively wide range of input voltages (Vin).

2. Since the bus capacitor 3 serves as an intermediate station of the power conversion, the output voltage (Vout) can have a relatively small ripple component.

3. Since the control module 6 adjusts the switching period of each of the first and second control signals (Vgs1, Vgs2) based on the output voltage (Vout), the output voltage (Vout) can be substantially constant.

It is noted that, in other embodiments of this disclosure, the following modifications may be made to this embodiment:

1. The third switch 45 may be an nMOSFET. In this case, the control module 6 is coupled further to the third switch 45, and controls operation of the third switch 45 between the ON state and the OFF state.

2. The fourth switch 531 may be an nMOSFET. In this case, the control module 6 is coupled further to the fourth switch 531, and controls operation of the fourth switch 531 between the ON state and the OFF state.

Figure 10:
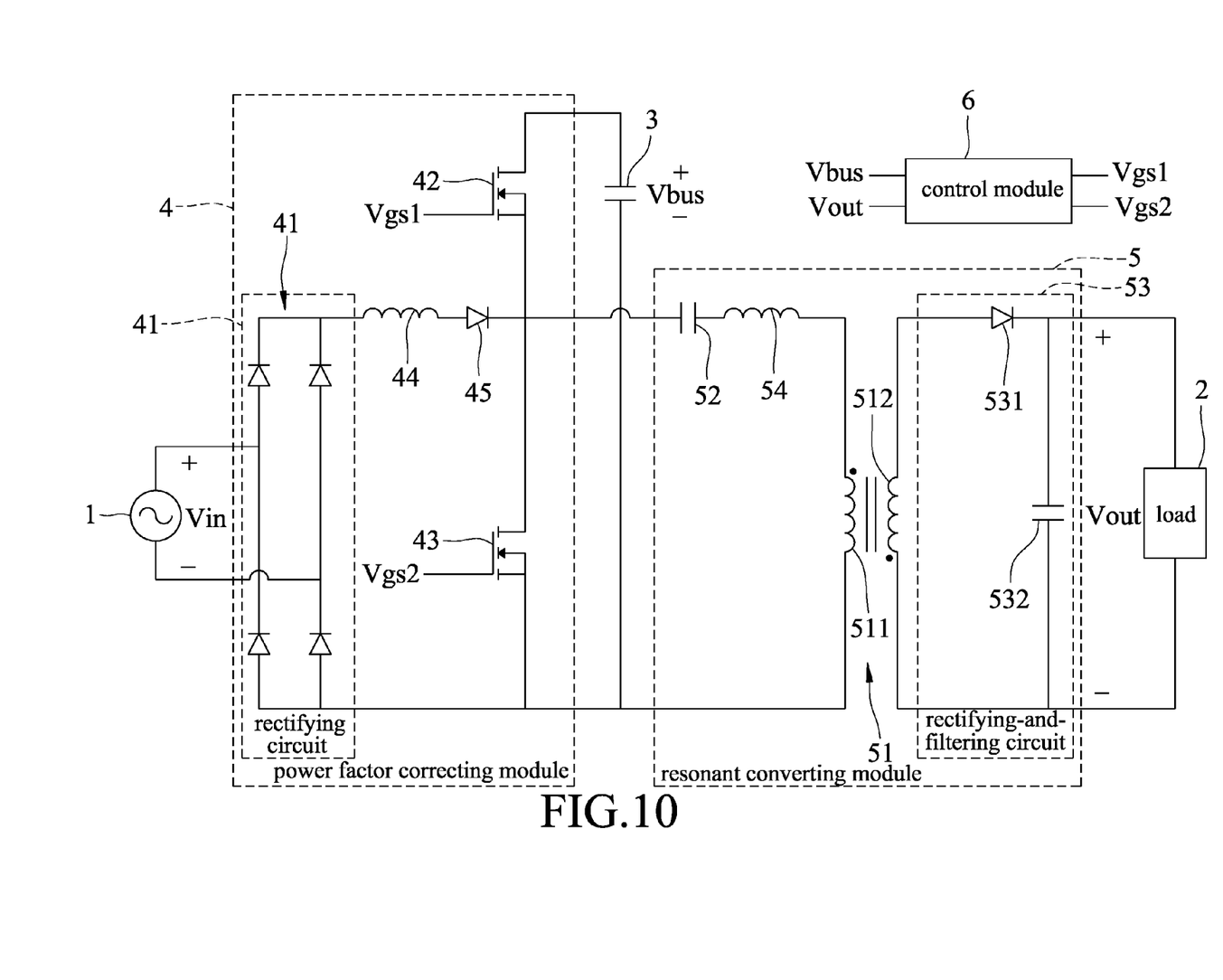
FIG. 10 is a circuit block diagram illustrating a modification of the embodiment.

3. Referring to FIG. 10, the resonant converting module 5 may further include a resonant inductor 54 coupled between the resonant capacitor 52 and the primary winding 511. In this case, the resonant capacitor 52 may resonate with the resonant inductor 54 and the leakage inductor 514 (see FIG. 9) at the resonant frequency determined by the capacitance of the resonant capacitor 52, an inductance of the resonant inductor 54 and the inductance of the leakage inductor 514 (see FIG. 9).

While this disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A single-stage AC-to-DC converter comprising:
   a bus capacitor;
   a power factor correcting module coupled to said bus capacitor, used to receive an AC (alternating current) input voltage, further receiving a first control signal and a second control signal, and generating, based on the input voltage and the first and second control signals, a DC (direct current) bus voltage across said bus capacitor and an intermediate voltage switching between the bus voltage and zero;
   a resonant converting module coupled to said power factor correcting module for receiving the intermediate voltage therefrom, and generating a DC output voltage based on the intermediate voltage; and
   a control module coupled to said bus capacitor for receiving the bus voltage therefrom, coupled further to said power factor correcting module, and generating, based on the bus voltage, the first and second control signals for said power factor correcting module, each of the first and second control signals switching between an active state and an inactive state, and having a duty cycle associated with the bus voltage;
   wherein said control module increases the duty cycle of the first control signal and decreases the duty cycle of the second control signal when the bus voltage is higher than a predetermined first target voltage, and decreases the duty cycle of the first control signal and increases the duty cycle of the second control signal when the bus voltage is lower than the first target voltage.

2. The single-stage AC-to-DC converter of claim 1, wherein said control module is coupled further to said resonant converting module for receiving the output voltage therefrom, and generates the first and second control signals based further on the output voltage, each of the first and second control signals having a switching period associated with the output voltage.

3. The single-stage AC-to-DC converter of claim 2, wherein said control module decreases the switching period of each of the first and second control signals when the output voltage is higher than a predetermined second target voltage, and increases the switching period of each of the first and second control signals when the output voltage is lower than the second target voltage.

4. The single-stage AC-to-DC converter of claim 1, wherein the first and second control signals have the same switching period, and are alternately in the active state, and when one of the first and second control signals is in the active state, the other one of the first and second control signals is in the inactive state.

5. The single-stage AC-to-DC converter of claim 4, wherein one of the first and second control signals switches to the active state at an end of a predetermined dead time interval counting from each instance of the other one of the first and second control signals switching to the inactive state.

6. The single-stage AC-to-DC converter of claim 1, wherein said power factor correcting module operates in a discontinuous conduction mode.

7. The single-stage AC-to-DC converter of claim 1, wherein said bus capacitor has a first terminal and a second terminal, the bus voltage is higher than an amplitude of the input voltage, and said power factor correcting module includes:
   a rectifying circuit having a first input terminal, a second input terminal, a first output terminal and a second output terminal that is coupled to said second terminal of said bus capacitor, and receiving the input voltage at said first and second input terminals thereof;
   a first switch having a first terminal that is coupled to said first terminal of said bus capacitor, a second terminal that is coupled to said resonant converting module, and a control terminal that is coupled to said control module for receiving the first control signal therefrom;
   a second switch having a first terminal that is coupled to said second terminal of said first switch, a second terminal that is coupled to said second output terminal of said rectifying circuit, and a control terminal that is coupled to said control module for receiving the second control signal therefrom, a voltage across said second switch serving as the intermediate voltage; and
   a boost inductor and a third switch coupled in series between said first output terminal of said rectifying circuit and said second terminal of said first switch.

8. The single-stage AC-to-DC converter of claim 7, wherein each of said first and second switches is an N-type metal oxide semiconductor field effect transistor, and said third switch is a diode.

9. The single-stage AC-to-DC converter of claim 7, wherein said boost inductor is coupled to said first output terminal of said rectifying circuit, and said third switch is coupled to said second terminal of said first switch.

10. The single-stage AC-to-DC converter of claim 7, wherein said rectifying circuit is a full bridge rectifying circuit.

11. The single-stage AC-to-DC converter of claim 1, wherein said resonant converting module includes:
- a transformer including a primary winding and a secondary winding;
- a resonant capacitor coupled to said primary winding in series, the series connection of said resonant capacitor and said primary winding being coupled to said power factor correcting module for receiving the intermediate voltage therefrom; and
- a rectifying-and-filtering circuit coupled to said secondary winding, and providing the output voltage.

12. The single-stage AC-to-DC converter of claim 11, wherein said resonant converting module further includes a resonant inductor coupled between said resonant capacitor and said primary winding.

13. The single-stage AC-to-DC converter of claim 11, wherein said rectifying-and-filtering circuit includes a switch and an output capacitor that are coupled in series across said secondary winding, a voltage across said output capacitor serving as the output voltage.

14. The single-stage AC-to-DC converter of claim 13, wherein said switch is a diode.

\* \* \* \* \*